(12) United States Patent
Harman

(10) Patent No.: US 9,815,516 B2
(45) Date of Patent: Nov. 14, 2017

(54) SYSTEM AND APPARATUS FOR ADJUSTING THE POSITION OF A GRIP ON A VEHICLE, AND RELATED METHODS

(71) Applicant: R. Lee Harman, Camano Island, WA (US)

(72) Inventor: R. Lee Harman, Camano Island, WA (US)

( * ) Notice: Subject to any disclaimer, the term of this patent is extended or adjusted under 35 U.S.C. 154(b) by 0 days.

(21) Appl. No.: 14/892,540

(22) PCT Filed: May 21, 2014

(86) PCT No.: PCT/US2014/038995
§ 371 (c)(1),
(2) Date: Nov. 19, 2015

(87) PCT Pub. No.: WO2014/190068
PCT Pub. Date: Nov. 27, 2014

(65) Prior Publication Data
US 2016/0096580 A1 Apr. 7, 2016

Related U.S. Application Data

(60) Provisional application No. 61/825,966, filed on May 21, 2013.

(51) Int. Cl.
*B62K 21/16* (2006.01)
*B62K 21/22* (2006.01)
*B62K 21/14* (2006.01)

(52) U.S. Cl.
CPC .............. *B62K 21/16* (2013.01); *B62K 21/14* (2013.01); *B62K 21/22* (2013.01)

(58) Field of Classification Search
CPC ................................ B62K 21/16; B62K 21/22
See application file for complete search history.

(56) References Cited

U.S. PATENT DOCUMENTS

| | | | | |
|---|---|---|---|---|
| 643,647 | A * | 2/1900 | Harmon | B62M 1/12 192/41 R |
| 4,688,817 | A * | 8/1987 | Marier | B62B 13/10 180/182 |
| 4,989,532 | A * | 2/1991 | Kishi | B63B 35/731 114/144 R |
| 5,327,798 | A | 7/1994 | Lerch | |
| 6,206,395 | B1 | 3/2001 | Young | |
| 6,929,278 | B2 * | 8/2005 | Vaïsanen | B62K 21/22 180/190 |

(Continued)

FOREIGN PATENT DOCUMENTS

| | | | |
|---|---|---|---|
| CZ | WO 2008151582 A1 * | 12/2008 | ............... B62J 1/12 |
| DE | 29900493 U1 | 12/1999 | |

(Continued)

*Primary Examiner* — Vicky Johnson
(74) *Attorney, Agent, or Firm* — Janeway Patent Law PLLC

(57) ABSTRACT

An apparatus for positioning and securing a steering grip in at least two different positions on a vehicle comprises a first frame configured to hold a grip that a person can use to steer and control a vehicle when the person holds the grip; a second frame operable to hold the first frame in a first position and operable to hold the first frame in a second position, wherein when the vehicle is driven by a person and the person holds the grip to steer and control the vehicle.

18 Claims, 8 Drawing Sheets

(56) References Cited

U.S. PATENT DOCUMENTS

| | | | |
|---|---|---|---|
| 7,341,013 B2* | 3/2008 | Yoshiki | B63B 1/22 114/144 R |
| 7,926,386 B1 | 4/2011 | Godfrey | |
| 2005/0194199 A1 | 9/2005 | Marks et al. | |
| 2006/0162483 A1 | 7/2006 | Bowers | |
| 2011/0100741 A1* | 5/2011 | King | B62K 11/14 180/219 |

FOREIGN PATENT DOCUMENTS

| | | |
|---|---|---|
| DE | 202004001701 U1 | 6/2004 |
| EP | 0424918 B1 | 5/1991 |
| WO | 2009/148266 A2 | 12/2009 |

\* cited by examiner

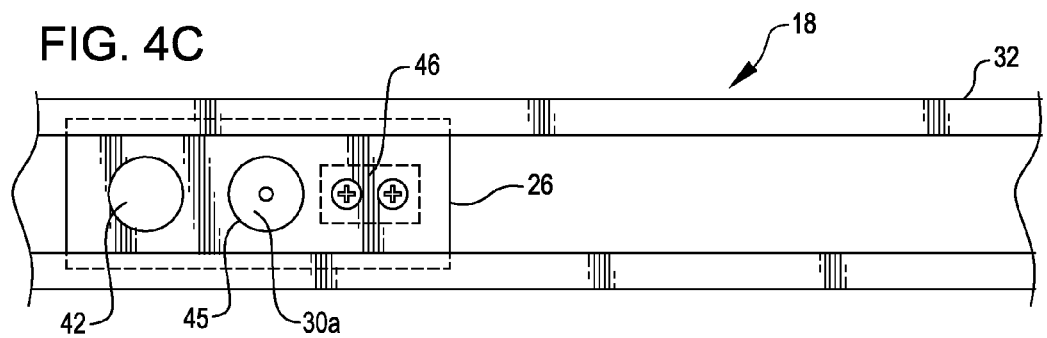
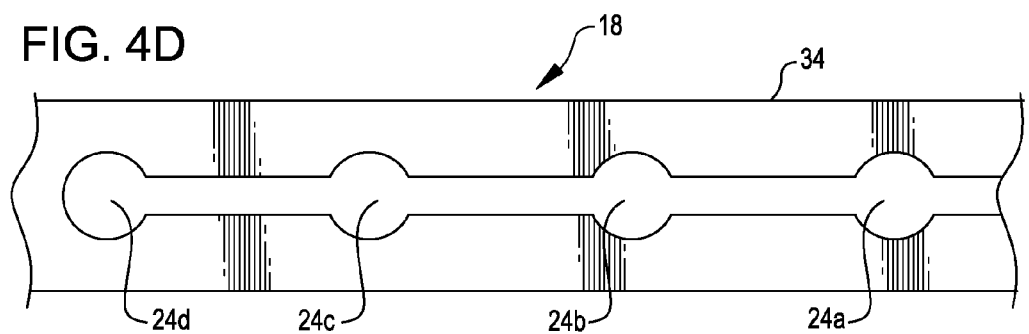

SYSTEM AND APPARATUS FOR ADJUSTING THE POSITION OF A GRIP ON A VEHICLE, AND RELATED METHODS

CROSS REFERENCE TO RELATED APPLICATION AND CLAIM OF PRIORITY

This application claims priority from commonly owned U.S. Provisional Patent Application 61/825,966, filed 21 May 2013, and titled Adjustable Control Position for Sport Motorcycles, and which is incorporated herein in its entirety by reference.

BACKGROUND

Motorcycles come in various shapes and sizes according to their intended use—either on or off-road. Street machines are generally either a cruiser or a sport-racer bike, each with its own geometry that determines what range of postures a driver may assume while driving. A more comfortable driver is a safer driver because being uncomfortable or unsettled on a bike brings on mental and physical fatigue much more quickly.

Cruisers are designed for long relaxing drives on fairly straight roads or highways, with the seat positioned low for a stable center of gravity. Cruising posture is popular, and understandably so, because the laid-back riding position allows greater extension of the legs. For comfort, the driver's body is upright and slightly reclined toward the rear of the motorcycle. As with all riding positions, the head and eyes are looking forward through the path of travel. The driver's arms are extended with elbows slightly bent. The leg position can be varied with the addition of accessory foot-pegs to make the cruiser even more comfortable; however, with comfort comes less control through turns. Cruiser bikes lose the ability to carve the turns, which remains the hallmark of a sport-racer motorcycle.

Sport bikes are designed for driving fast on twisty, winding roads. This type of more aggressive driving demands that the driver assume a forward crouched posture to have more control of the vehicle. The driver's head is angled in front of the body, with the head and eyes looking through the path of travel. The upper body is angled in front of the hips. The stomach lies over the fuel tank, while the back muscles and legs support the weight of the upper torso. The driver's knees are bent and held against the fuel tank, with feet resting on foot-pegs in a position behind the knees.

The sport posture positions much of the driver's weight close to the front tire; however, the driver's ability to see far down the road is reduced. In addition, the sport riding position is often cramped, which may be difficult to sustain for more than a couple of hours. Thus, driving a motorcycle on a long ride in the sport position without any real ability to shift positions or straighten one's back, neck and shoulders may cause the driver to suffer. Over long straight distances such as interstate highway riding, it is not unusual for a driver to experience neck pain, forearm numbness, back strain and other maladies induced by the forward crouched riding posture.

SUMMARY

In an aspect of the invention, an apparatus for positioning and securing a steering grip in at least two different positions on a vehicle comprises a first frame configured to hold a grip that a person can use to steer and control a vehicle when the person holds the grip; a second frame operable to hold the first frame in a first position and operable to hold the first frame in a second position, wherein when the vehicle is driven by a person and the person holds the grip to steer and control the vehicle, the first position is located farther away from the person than the second position; and a lock operable to releasably secure the first frame in the first position when the first frame is located at the first position, and operable to releasably secure the first frame in the second position when the first frame is located at the second position.

With the apparatus, one can change, even while driving, the position of the grips of a vehicle as desired to accommodate different driving postures. For example, one may secure the grips of the motorcycle in the first position located away from one's body to more easily assume a forward crouched position for more control through a curve. Then, one may secure the grips in the second position located closer to one's body to enjoy a comfortable upright posture while driving. Because one can change the position of the grips in seconds, even while driving, one can comfortably and safely drive one's sport-bike on a long drive having many curves and long stretches of a substantially straight road.

BRIEF DESCRIPTION OF THE FIGURES

FIG. 4C is a partial view of the outboard side of the apparatus shown in FIG. 3, according to an embodiment of the invention.

FIG. 4D is a partial view of the inboard side of the apparatus shown in FIG. 3, according to an embodiment of the invention.

DETAILED DESCRIPTION

Figure 1:
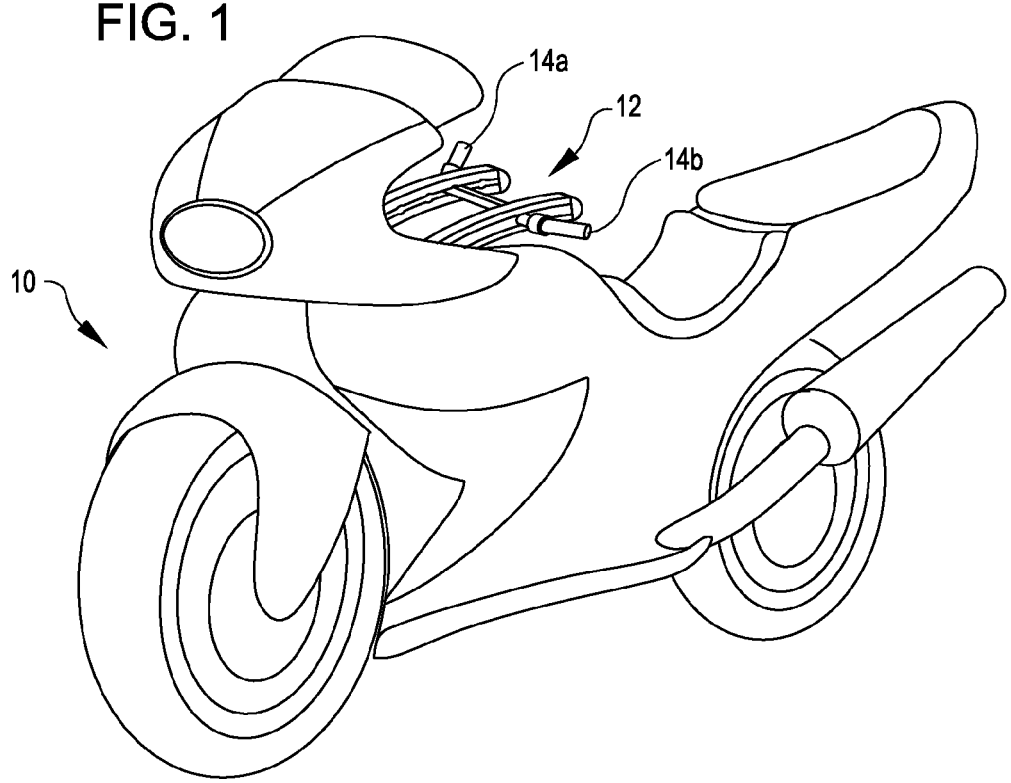
FIG. 1 is a perspective view of a vehicle that includes an apparatus for positioning and securing a grip that one can use to steer and control the vehicle, according to an embodiment of the invention.

FIG. 1 shows a perspective view of a vehicle 10 that includes an apparatus 12, according to an embodiment of the invention. The apparatus 12 positions and secures a grip (here two, 14a and 14b) that a person can use to steer and control the vehicle 10 (here a motorcycle), in at least two different positions on the vehicle 10. Although the vehicle 10 shown in FIG. 1 is a motorcycle, the apparatus 12 may be used with other vehicles, such as a three-wheeled motorcycle or a bicycle. And, although the apparatus 12 is shown positioning and securing two grips 14a and 14b, the apparatus 12 may position and secure a single grip 14 or more than two grips 14. The apparatus 12 includes a first frame (16, discussed in greater detail in conjunction with FIGS. 3-4C) configured to hold the grips 14a and 14b, and a second frame (18, discussed in greater detail in conjunction with FIGS. 3-4D) operable to hold the first frame, and thus the grips 14a and 14b, in at least two different positions. The apparatus 12 also includes a lock (20, discussed in greater detail in conjunction with FIGS. 5A-6B) operable to releasably secure the first frame in each of the at least two positions.

With the apparatus 12, one can change, even while driving, the position of the grips 14a and 14b of the vehicle 10 as desired to accommodate different driving postures. For example, in this and other embodiments, one may secure the grips 14a and 14b of the motorcycle in a first position (shown in FIG. 2A) to more easily assume a forward crouched position for more control through a series of curves. Then, after driving through the curves one may move and secure the grips 14a and 14b in a second position (shown in FIG. 2B) to enjoy a more comfortable, upright posture while driving. Because one can change the position of the grips 14a and 14b in seconds, even while driving, one can comfortably and safely drive a sport-bike on a long drive having many curves and long stretches of a substantially straight road.

The apparatus 12 may position and secure the grips 14a and 14b in any desired number of positions, each of which may be at any desired location. For example, in this and other embodiments, the apparatus 12 may position and secure each of the grips 14a and 14b in a first position, a second position and three other positions located between the first and second positions (discussed in greater detail in conjunction with FIG. 3). The first position (shown in FIG. 2A) includes both of the grips 14a and 14b located farther away from one's body. In this position, one can lean forward closer to the front wheel 22 to have more control when driving through curves, such as those found on winding roads. The second position (shown in FIG. 2B) includes both of the grips 14a and 14b located closer to one's body. In this position, one can sit upright (further away from the front wheel 22) with a straight back and relaxed legs for more comfortable driving on long, substantially-straight roads. In addition, each of the five positions is located about three inches away from the one or two adjacent positions. In other embodiments, it may be desirable to have a different number of positions that are spaced differently. For example, it may be desirable to have 6 positions, three of which are located at the fore of the apparatus 12 and spaced two inches apart, and three of which are located at the aft of the apparatus 12 and also spaced two inches apart, with the foremost aft position being spaced more than 2 inches apart from the rearmost forward position.

Still referring to FIG. 1, the apparatus 12 may be mounted to the vehicle 10 in any desired manner. For example, in this and other embodiments, the second frame of the device 12 is mounted to the vehicle's steering fork using a conventional fork mount (not shown). To fasten the second frame of the apparatus 12 to the fork, any conventional fastener, such as a threaded bold and corresponding threaded nut, may be used.

Figure 2A:
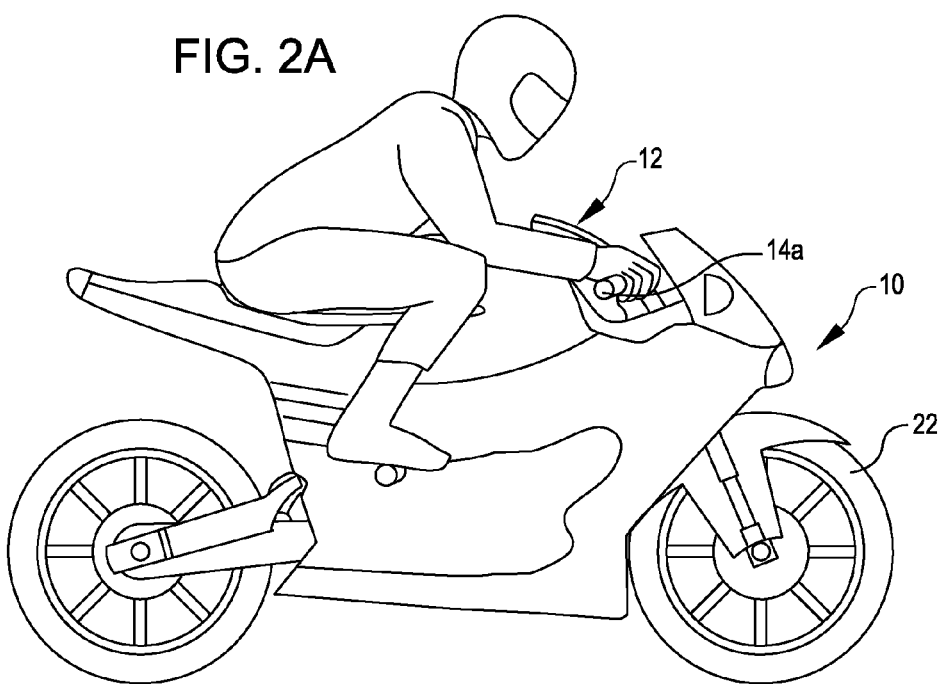
FIGS. 2A and 2B are side views of a driver on a vehicle that includes the apparatus shown in FIG. 1, according to an embodiment of the invention.
Figure 2B:
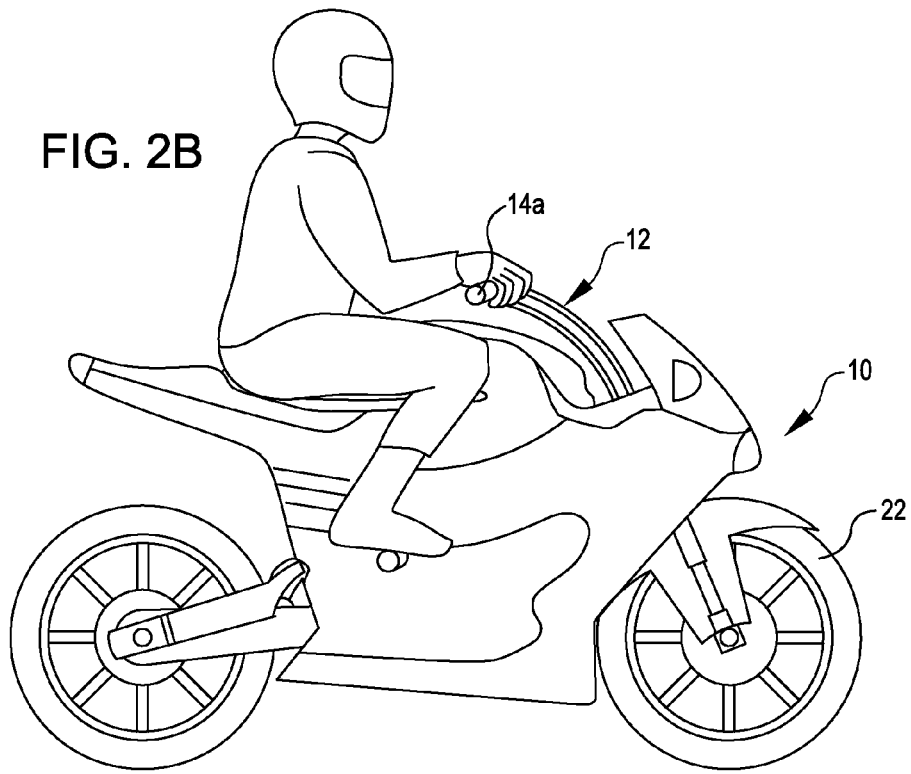
Figure 3:
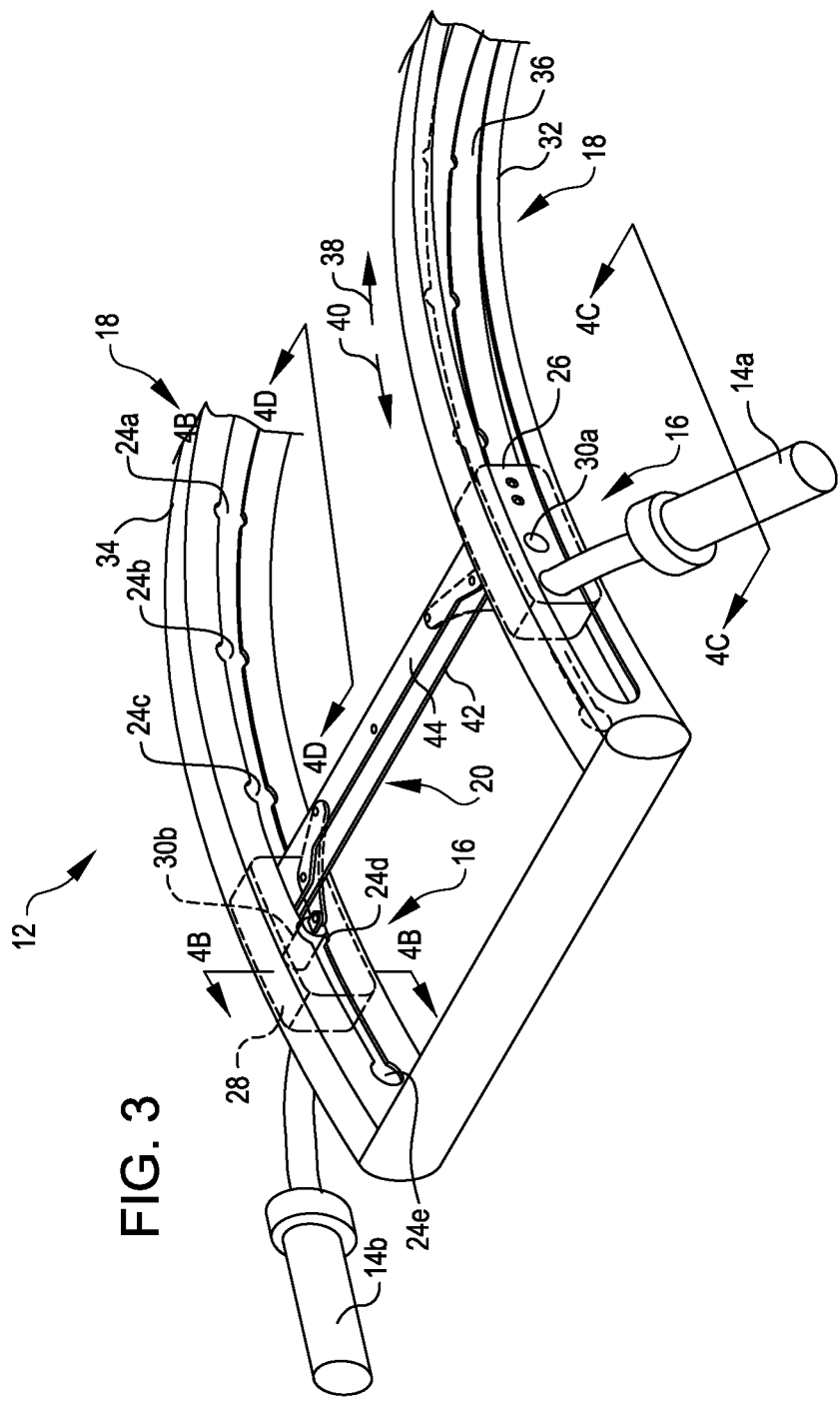
FIG. 3 is a perspective view of the apparatus shown in FIG. 1, according to an embodiment of the invention.

FIG. 3 shows a perspective view of the apparatus 12 shown in FIGS. 1-2B, according to an embodiment of the invention. In this and other embodiments of the apparatus 12, the second frame 18 includes five pairs of receptacles 24a-24e (only one of each pair is shown), each pair establishing a respective one of the five positions, and the lock 20 uses each one of the five pairs of receptacles 24a-24e to releasably secure the grips 14a and 14b in a respective one of the five positions. The lock 20 uses the receptacle 24a to releasably secure the grips 14a and 14b in the first position (shown in FIG. 2A), and the receptacle 24e to releasably secure the grips 14a and 14b in the second position (shown in FIG. 2B).

The first frame 16 of the apparatus 12 may be configured as desired to hold the grips 14a and 14b. For example, in this and other embodiments, the first frame 16 includes a first portion 26 and a second portion 28, each configured to releasably hold a respective one of the two grips 14a and 14b using any desired fastening technique, such as a threaded bolt (not shown). Each of the two first frame portions 26 and 28 is also configured to hold a pin 30 of the lock 20. When an end of the pin 30 is inserted into a receptacle of one of the pairs of receptacles 24a-24e, the receptacle prevents the pin 30 from moving to another position, and thus secures the respective first frame portion 26 or 28 (and the attached grips 25a or 25b) in the position established by the receptacle.

Still referring to FIG. 3, the second frame 18 of the apparatus 12 may be configured as desired to hold the first frame 16 in at least two different positions. For example, in this and other embodiments, the second frame 18 includes a first portion 32 that holds the first portion 26 of the first frame 16, and a second portion 34 that holds the second portion 28 of the first frame 16. As discussed in greater detail in conjunction with FIGS. 4A and 4B, each of the first and second portions 32 and 34 includes a groove 36, that allows a respective one of the first frame's first and second portions 26 and 28 to travel in either of the two directions shown by the arrows 38 and 40, when the first frame 16 is not secured in a specific position. The second frame 18 also includes the five pairs of receptacles 24a-24e. The first portion 32 of the second frame 18 includes one of the two receptacles of each of the five pairs of receptacles 24a-24e, and the second portion 34 includes the other of the two receptacles of each of the five pairs of receptacles 24a-24e. As previously mentioned, the pair of receptacles 24a corresponds to the first position shown in FIG. 2A, and the pair of receptacles 24e corresponds to the second position shown in FIG. 2B.

Still referring to FIG. 3, the lock 20 may be configured as desired to releasably secure the first frame 16 in at least two different positions. For example, in this and other embodiments, the lock 20 includes a body 42 that couples the two portions 26 and 28 of the first frame 16 together, thus allowing one to move simultaneously both portions 26 and 28 of the first frame 16 to the various positions. The lock 20 also includes a first pin 30a held by the first portion 26 of the first frame 16, and a second pin 30b held by the second portion 28 of the first frame 16. When both pins 30a and 30b are inserted into a respective one of the two receptacles of one of the five pairs of receptacles 24a-24e, the lock 20 secures the first frame 16, and thus the grips 14a and 14b in the position corresponding to the pair of receptacles. The lock 20 also includes a trigger 44 to move the pins 30a and 30b out of the receptacle, and thus allow one to move the first frame 16, and the grips 14a and 14b to another position.

The first frame 16, second frame 18 and lock 20 may each be constructed from any desired material using any desired techniques. For example, in this and other embodiments each of the first frame 16, second frame 18 and lock 20 is constructed from steel that has been machined and joined using conventional machining and joining techniques. In other embodiments, the first frame 16, second frame 18 and lock 20 may be constructed from titanium, aluminum, magnesium, and/or carbon-fiber composites.

Figure 4A:
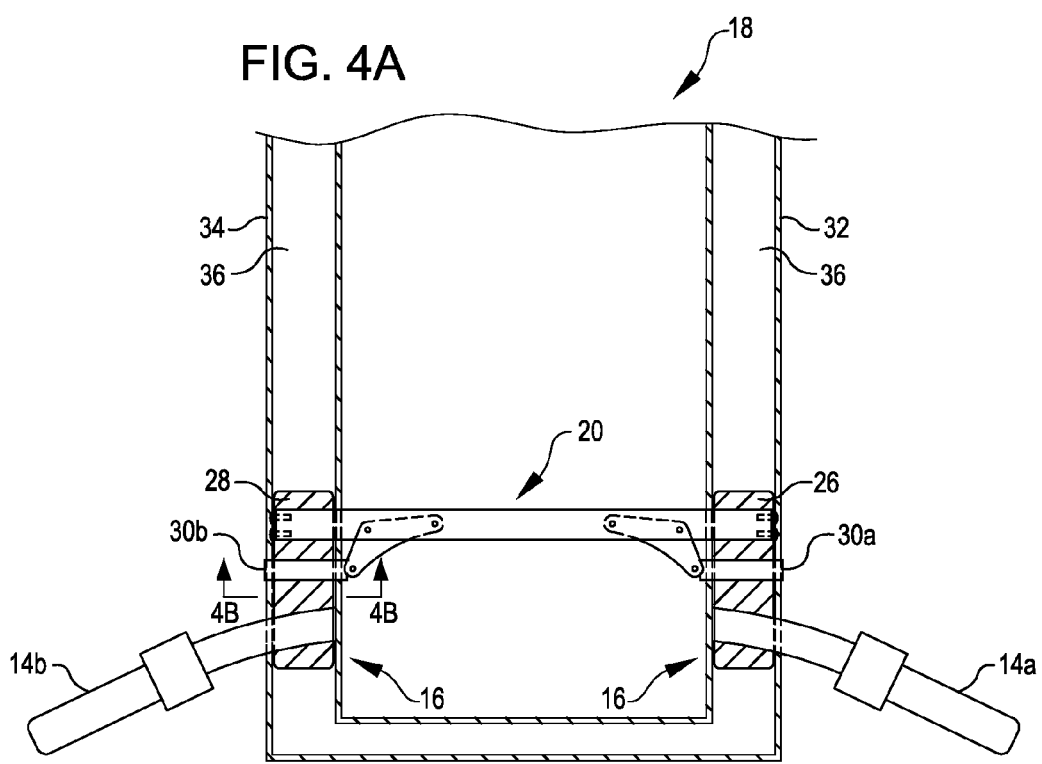
FIG. 4A is a cross-sectional view of the apparatus shown in FIG. 3, according to an embodiment of the invention.
Figure 4B:
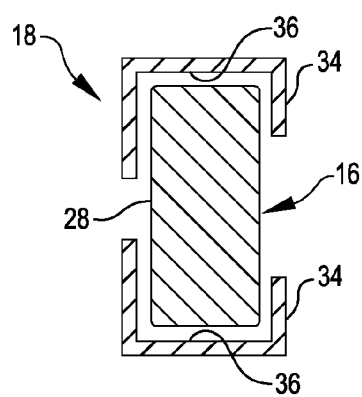
FIG. 4B is a partial cross-sectional view of the apparatus shown in FIG. 3, according to an embodiment of the invention.

FIGS. 4A-4D show four views of the apparatus 12 shown in FIG. 3, each according to an embodiment of the invention. FIG. 4A shows a top cross-sectional view of the apparatus 12. FIG. 4B shows a partial cross-sectional view of the apparatus 12. FIG. 4C shows a partial side view of the apparatus 12 from the outboard side of the apparatus 12. FIG. 4D shows a partial side view of the apparatus 12 from the inboard side of the apparatus 12.

Referring to FIGS. 4A and 4B, the second frame 18 may hold the first frame 16 in any desired manner that allows the first frame 16 to move to each position. For example in this and other embodiments and as previously mentioned, the second frame 18 includes a first portion 32 that has a groove 36 in which the first frame portion 26 lies, and a second portion 34 that has a groove 36 in which the first frame portion 28 lies. Each of the grooves 36 is sized to retain its respective one of the two first frame portions 26 and 28, and to allow it's respective one of the two first frame portions 26 and 28 to slide to each of the different positions.

Referring to FIG. 4C, each of the first frame portions 26 and 28 (only 26 shown) may be configured as desired to hold a respective one of the grips 14a and 14b, and a respective one of the pins 30a and 30b. For example, in this and other embodiments, each of the first frame portions 26 and 28 includes a grip-receiver 42 for mounting one of the grips 14a and 14b, as previously mentioned. Each of the first frame portions 26 and 28 also includes a pin-receiver 45 (shown and discussed in greater detail in conjunction with FIGS. 5A-5B) that houses a respective one of the pins 30a and 30b, and allows the pin 30a or 30b to move into and out of a receptacle. Each of the first frame portions 26 and 28 also includes a region 46 where the body 42 of the lock 20 may be fastened.

Referring to FIG. 4D, the receptacles 24a-24e may be configured as desired. For example, in this and other embodiments, each of the receptacles 24a-24e is a round hole sized to accommodate a respective one of the pins 30a and 30b that it receives to secure the grips 14a and 14b when the grips are located in a desired position corresponding to the receptacle. In other embodiments, the receptacles may be square in shape. In still other embodiments the receptacles may be configured to receive a two-pronged pin. In still other embodiments, the receptacles may be detents or cavities, not holes, in the wall of the second frame.

Figure 5A:
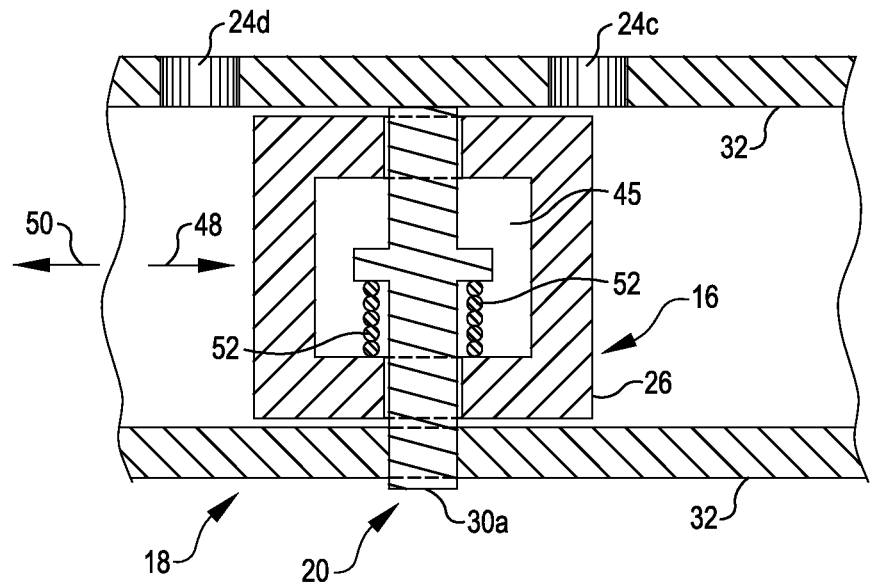
FIGS. 5A and 5B are partial views of the lock of the apparatus shown in FIG. 3 in unlocked and locked positions, respectively, according to an embodiment of the invention.
Figure 5B:
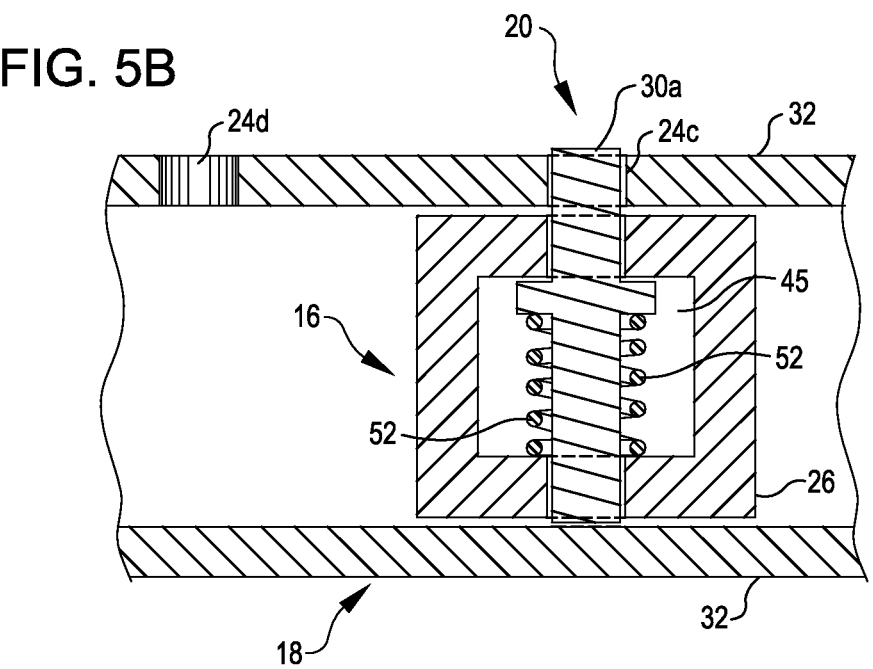

Each of the FIGS. 5A and 5B shows, according to an embodiment of the invention, a partial cutaway view of the apparatus 12, and more specifically, the lock 20. FIG. 5A shows the pin 30a of the lock 20 not inserted into any of the receptacles to allow one to move the first frame portion 26, and thus the grip 14a, to one of the five positions established by one of the five pairs of receptacles 24a-24e. FIG. 5B shows the pin 30a inserted into a receptacle 24c to secure the first frame portion 26, and thus the grip 14a, in the position established by the receptacle 24c. Although, FIGS. 5A and 5B show one of the two pins 30a and 30b inserted into a receptacle and withdrawn from a receptacle, the discussion of the lock 20 in conjunction with FIGS. 5A and 5B applies to the other half of the apparatus 12 and lock 20, more specifically pin 30b, first frame portion 28 and second frame portion 34.

As previously mentioned, the lock 20 may be configured as desired to releasably secure the first frame 16 in the different positions. For example, in this and other embodiments, the lock 20 includes the pin 30a and a spring 52 to urge the end of the pin 30a into a receptacle when the pin 30a is aligned with the receptacle. And, the first portion 26 of the first frame 16 includes a pin-receiver 45 that houses the pin 30a and spring 52. The pin 30a is sized and configured to be received (shown in FIG. 5B) by one of the two receptacles in each of the five pairs of receptacles 24a-24e. When received by a receptacle, the receptacle prevents the pin 30a from moving toward other receptacles in the first portion 32 of the second frame 18, i.e. in either of the directions indicated by the arrows 48 and 50. To couple the pin 30a to the first portion 26 of the first frame 16, the pin-receiver 45 holds the pin 30a and constrains the pin's movement to a direction that is substantially perpendicular to the directions indicated by the arrows 48 and 50.

In an unlocked position, as shown in FIG. 5A, the pin 30a is not engaged in a receptacle, and the first portion 26 of the first frame 16 is free to slide within the groove 36 in either of the directions indicated by the arrows 48 and 50. In this unlocked position, the spring 52 is compressed and urges the pin 30a against the wall of the first portion 32 of the second frame 18. When one moves the first portion 26 of the first frame 16 with the grip 14a (FIG. 3) to a desired position, the pin 30a aligns with the receptacle associated with the desired position, and the spring 52 pushes the pin 30a into the receptacle. After the end of the pin 30a is inserted into the receptacle, the spring 52 remains in compression to keep the end of pin 30a in the receptacle. With the pin 30a in the receptacle, the first portion 26 of the first frame 16, and thus the grip 14a, is secured at the position associated with the receptacle until the driver chooses to withdraw the pin 30a (discussed in greater detail in conjunction with FIGS. 6A and 6B) and change the position of the grip 14a.

Figure 6A:
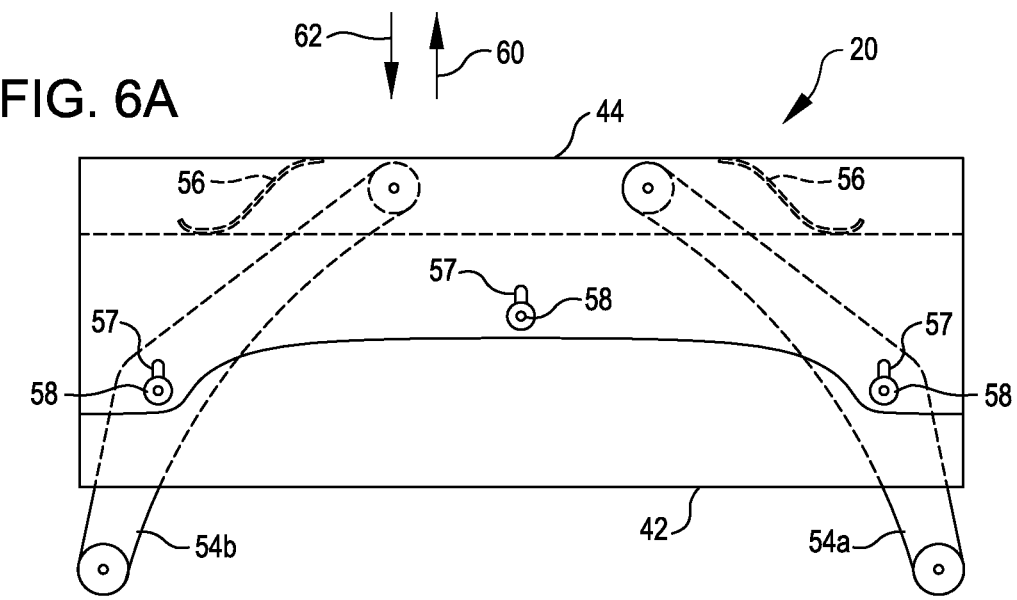
FIGS. 6A and 6B are other partial views of the lock of the apparatus shown in FIG. 3, according to an embodiment of the invention.
Figure 6B:
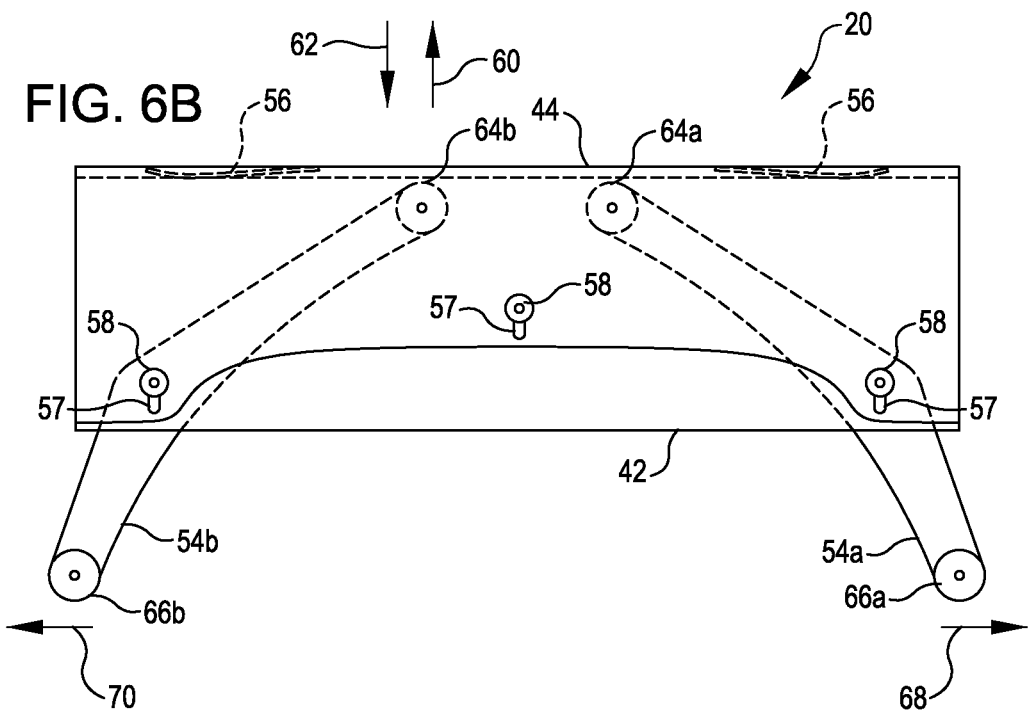

Each of the FIGS. 6A and 6B shows, according to an embodiment of the invention, a partial view of the lock's body 42 and trigger 44. The trigger 44 allows one to move the pins 30a and 30b (FIGS. 5A and 5B) out of their respective receptacles in the second frame 18 with a single hand. This allows one to move the grips 14a and 14b to another position, while driving the vehicle 10 (FIGS. 1-2B) because one can keep a hand on one of the grips 14a and 14b while the other hand moves the grips 14a and 14b to another position. FIG. 6A shows a position of the trigger 44 when the trigger 44 is not used move the pins 30a and 30b from their respective receptacles, and FIG. 6B shows a position of the trigger 44 when the trigger 44 is used to move the pins 30a and 30b from their respective receptacles.

In this and other embodiments, the lock 20 includes a body 42, a trigger 44 that is moveable relative to the body 42, and links 54a and 54b that transmit the motion of the trigger 44 to the pins 30a and 30b, respectively. The lock 20 also includes a spring 56 that urges the trigger 44 away from the body 42, and thus toward a position in which the pins 30a and 30b remain in their respective receptacle. As previously mentioned, the body 42 couples the first portion 26 (FIG. 4A) of the first frame 16 (FIG. 4A) to the second portion 28 (FIG. 4A) of the first frame 16 to allow one to move simultaneously the first and second portions 26 and 28. The trigger 44 includes slots 57 through which connectors 58 pass to couple the trigger 44 to the body 42 and to allow the trigger 44 to move relative to the body 42 in the directions indicated by the arrows 60 and 62. Each of the links 54a and 54b includes a respective one of the ends 64a and 64b that contacts the trigger 44, and another respective one of the ends 66a and 66b that contacts a respective one of the pins 30a and 30b. Each of the links 54a and 54b is pivotably coupled to the body 42 by a respective one of the three connectors 58 to allow each of the links 54a and 54b to rotate about its respective connector 58 when the trigger 44 is moved in the direction indicated by the arrow 62 (shown in FIG. 6B). As the link 54a rotates about the connector 58, the end 66a moves in the direction indicated by the arrow 68, and pushes the pin 30a out of the receptacle (not shown) that the pin 30a lies in. With the pin 30a out off the receptacle, the first portion 26 of the first frame 16 may be moved toward another position. Similarly, As the link 54b rotates about the connector 58, the end 66b moves in the direction indicated by the arrow 70, and pushes the pin 30b out of the receptacle (not shown) that the pin 30b lies in. With both pins 30a and 30b out of their respective receptacles, one my move both portions 26 and 28 of the first frame 16, and the grips 14a and 14b to another position.

Figure 7:
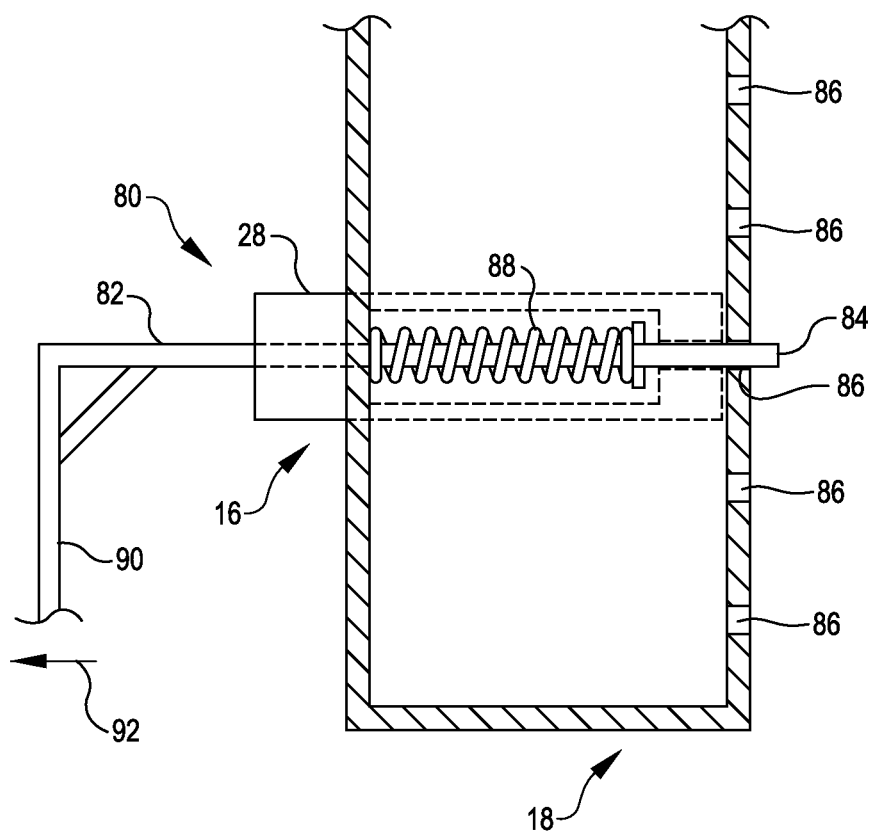
FIG. 7 is a partial cutaway view of a lock of an apparatus, according to another embodiment of the invention.

FIG. 7 is a partial cutaway view of a lock 80 according to another embodiment of the invention. The lock 80 is similar to the lock 20 shown and discussed in conjunction with FIGS. 3, 4A and 5A-6B, except that the lock 80 includes a pin-retractor 82 connected to the pin 84 that allows one to move the pin 84 out of a receptacle 86 of the second frame 18 without removing one's hand from the grip (not shown). Similar to the lock 20, in this and other embodiments the second portion 28 of the first frame 16 holds the pin 84 and pin-retractor 82, and the first portion 26 (not shown) of the first frame 16 holds another pin-retractor (not shown) that may be used with one's other hand that holds the other grip 14a (not shown). And, similar to the lock 20, the lock 80 includes a spring 88 that urges the end of the pin 84 into a receptacle 86 when the pin 84 is aligned with the receptacle, and keeps the pin 84 in the receptacle 86 until one withdraws the pin 84. To withdraw pin 84 from a receptacle 86, one exerts pressure on the end 90 of the pin-retractor 82 in the direction indicated by the arrow 92 to move the pin-retractor 82, and thus the pin 84 in the same direction.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. An apparatus for positioning and securing a grip that a person can use to steer and control a vehicle, in at least two different positions on the vehicle, the apparatus comprising:
   a first frame configured to hold a grip that a person can use to steer and control a vehicle when the person holds the grip;
   a second frame operable to hold the first frame in a first position and operable to hold the first frame in a second position;
   a lock operable to releasably secure the first frame in the first position when the first frame is located at the first position, and operable to releasably secure the first frame in the second position when the first frame is located at the second position; and
   wherein:
      the second frame includes:
         a first receptacle that the lock engages to secure the first frame in the first position,
         a second receptacle that the lock engages to secure the first frame in the second position, and
         a groove that holds the first frame, and is configured to allow the first frame to slide from the first position to the second position and from the second position to the first position, but to not allow the first frame to move in any other direction relative to the second frame, and
      the lock is configured such that when the first frame is moved toward the second position, the lock is withdrawn from the first receptacle.

2. The apparatus of claim 1 wherein the first frame is configured to releasably hold a steering grip of a motorcycle.

3. The apparatus of claim 1, wherein the second frame is operable to hold the first frame in a third position.

4. The apparatus of claim 1 wherein the second frame is operable to hold the first frame in five different positions.

5. The apparatus of claim 1 wherein the second frame is mountable to a steering fork of a motorcycle.

6. The apparatus of claim 1 wherein:
   the first frame includes:
      a first portion configured to hold a first grip of a motorcycle, and
      a second portion configured to hold a second grip of a motorcycle; and
   the second frame's groove includes:
      a first groove that holds the first portion of the first frame,
      a second groove that holds the second portion of the first frame, and
      the first and second grooves being configured to allow their respective first frame portions to move from a respective first position to a respective second position and from the respective second position to the respective first position, but to not allow the respective first frame portions to move in any other direction relative to the first and second grooves.

7. The apparatus of claim 1 wherein the lock includes a pin that is inserted into the first receptacle of the second frame to secure the first frame at the first position.

8. The apparatus of claim 1 wherein the lock includes a pin that is withdrawn from the first receptacle of the second frame to allow the first frame to be moved toward the second position.

9. The apparatus of claim 1 wherein the lock includes:
   a pin that is inserted into the first receptacle of the second frame to secure the first frame at the first position, and
   a spring that urges the pin into the receptacle when the pin is aligned with the receptacle.

10. The apparatus of claim 1 wherein the lock includes:
    a body, and
    a trigger that when moved relative to the body allows the first frame to be moved toward the second position.

11. The apparatus of claim 1 wherein the lock includes:
    a body,
    a pin that is inserted into the first receptacle of the second frame to secure the first frame at the first position,
    a trigger that when moved relative to the body allows the first frame to be moved to the second position, and
    a link that mechanically couples the trigger with the pin, such that when the trigger is moved toward the body the link pivots about an axis and pushes the pin out of the second frame's receptacle to allow the first frame to be moved toward the second position.

12. A method for changing the location of a grip that a person can use to steer and control a vehicle, and releasably securing the grip in at least two different positions, the method comprising:
    withdrawing a lock from a first receptacle of a second frame of an apparatus to release from a first position a first frame of the apparatus, wherein the first frame holds a grip that a person can use to steer and control a vehicle when the person holds the grip;

sliding the first frame in a groove of the second frame toward a second position that is located closer to a person than the first position is when the vehicle is driven by a person and the person holds the grip to steer and control the vehicle; and engaging a second receptacle of the second frame with the lock to releasably secure the first frame and grip in the second position.

13. The method of claim 12 wherein withdrawing the lock from the first receptacle includes removing a pin of the lock from the first receptacle of the second frame.

14. The method of claim 12 wherein engaging the second receptacle of the second frame with the lock includes inserting a pin of the lock into the second receptacle of the second frame.

15. The method of claim 12 further comprising moving the first frame and grip toward the second position while the person steers and controls the vehicle.

16. The method of claim 12 further comprising:

withdrawing the lock from the second receptacle of the second frame to release the first frame and grip from the second position, sliding the first frame in the groove of the second frame toward the first position, and engaging the first receptacle of the second frame with the lock to releasably secure the first frame and grip in the first position.

17. A vehicle comprising:

a steering grip that a person can use to steer and control a vehicle when the person holds the grip; and an apparatus for positioning and securing the grip in at least two different positions, the apparatus comprising:

a first frame configured to hold the grip, a second frame operable to hold the first frame in a first position and operable to hold the first frame in a second position, a lock operable to releasably secure the first frame in the first position when the first frame is located at the first position, and operable to releasably secure the first frame in the second position when the first frame is located at the second position; and wherein:

the second frame includes:

a first receptacle that the lock engages to secure the first frame in the first position, a second receptacle that the lock engages to secure the first frame in the second position, and a groove that holds the first frame, and is configured to allow the first frame to slide from the first position to the second position and from the second position to the first position, but to not allow the first frame to move in any other direction relative to the second frame, and the lock is configured such that when the first frame is moved toward the second position, the lock is withdrawn from the first receptacle.

18. The vehicle of claim 17 wherein the vehicle is a motorcycle.

* * * * *